United States Patent [19]

Chou

[11] Patent Number: 5,413,699
[45] Date of Patent: May 9, 1995

[54] FCC PROCESS WITH FINES TOLERANT SCR REACTOR

[75] Inventor: Tai-Sheng Chou, Pennington, N.J.

[73] Assignee: Mobil Oil Corporation, Fairfax, Va.

[21] Appl. No.: 136,053

[22] Filed: Oct. 14, 1993

[51] Int. Cl.[6] .............................................. C10G 11/00
[52] U.S. Cl. .................................. 208/113; 423/239.1; 423/239.2
[58] Field of Search ................... 208/113; 423/239.1, 423/239.2

[56] References Cited

U.S. PATENT DOCUMENTS

| | | | |
|---|---|---|---|
| 3,733,181 | 5/1973 | Tourtellotte et al. | 23/288 F |
| 4,246,234 | 1/1981 | Kittrell et al. | 422/171 |
| 4,434,147 | 2/1984 | Dimpel | 208/113 |
| 4,670,226 | 6/1987 | Furuyama et al. | 422/216 |
| 4,682,470 | 7/1987 | Shaff | 60/299 |
| 4,778,665 | 10/1988 | Krishnamurthy et al. | 208/113 |
| 4,847,054 | 7/1989 | Weisweiler | 423/239 |
| 4,851,202 | 7/1989 | Fennemann | 423/239 |
| 4,867,953 | 9/1989 | Riekert et al. | 423/239 |
| 4,950,139 | 8/1990 | Fennemann et al. | 423/239 |
| 4,986,897 | 1/1991 | Chin | 208/113 |
| 5,116,586 | 5/1992 | Baacke et al. | 423/239.2 |
| 5,143,707 | 9/1992 | Beck et al. | 423/239.2 |
| 5,173,278 | 12/1992 | Marler et al. | 423/239.2 |

Primary Examiner—Asok Pal
Assistant Examiner—Walter D. Griffin
Attorney, Agent, or Firm—Alexander J. McKillop; Malcolm D. Keen; Richard D. Stone

[57] ABSTRACT

A process for reducing NOx emissions and an FCC process using same as a flue gas cleanup stage are disclosed. Gas containing NOx and entrained catalyst fines is passed up through a bed of catalyst at a sufficient velocity to expand and fluidize the catalyst bed. Particulates deposited on the catalyst are abraded or elutriated away by fluidization, preventing fouling of the DeNOx catalyst. A low pressure drop design, with vertical, perforate gas distributors covered by the bed is also disclosed.

9 Claims, 2 Drawing Sheets

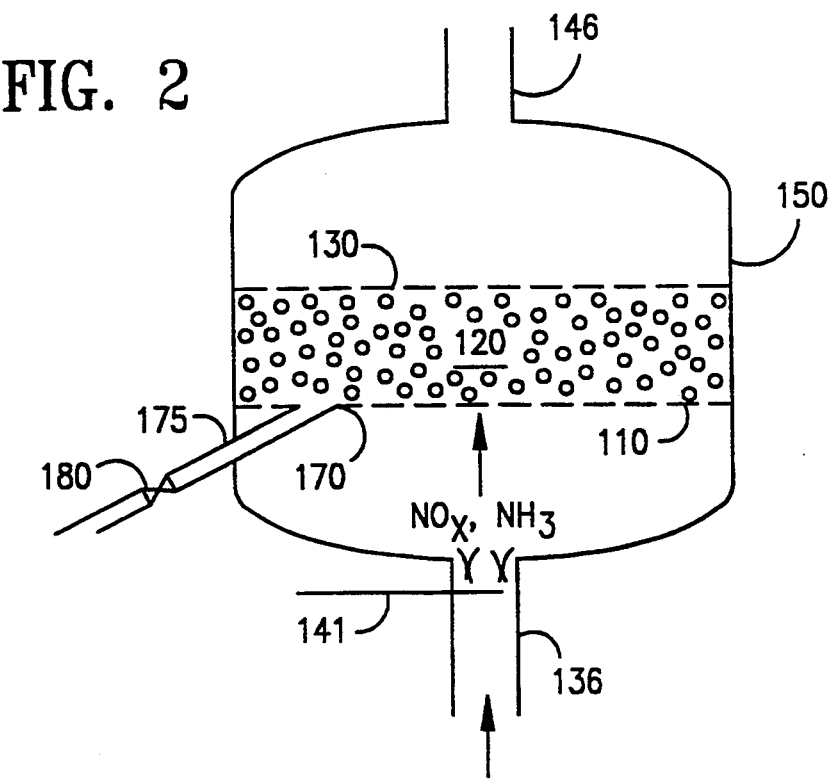
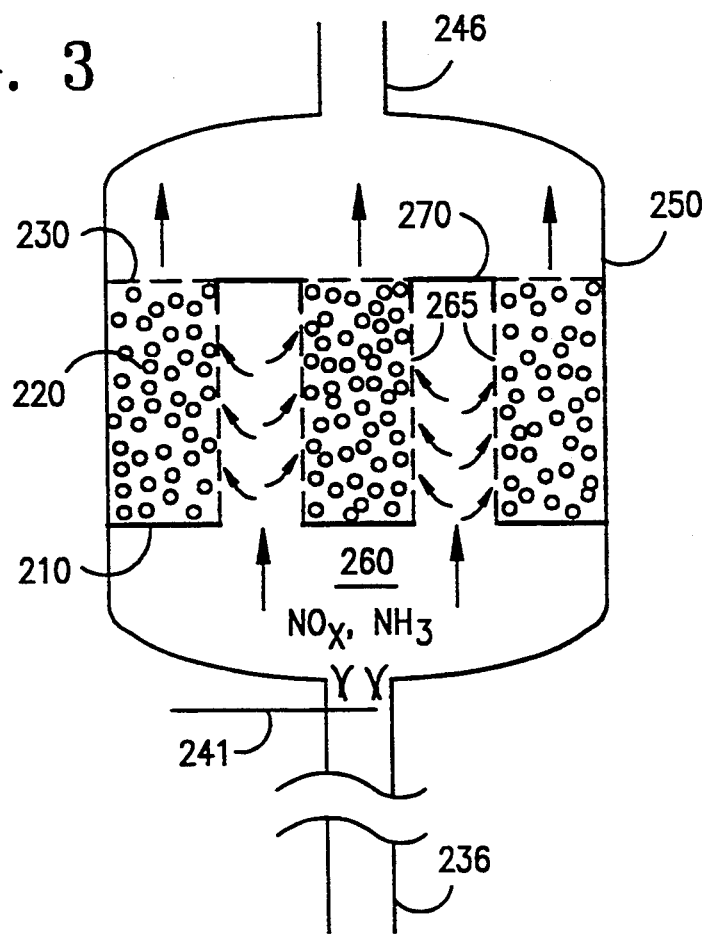

FCC PROCESS WITH FINES TOLERANT SCR REACTOR

BACKGROUND OF THE INVENTION

1. Field of the Invention

The field of the invention is fluidized catalytic cracking (FCC) of heavy hydrocarbon feeds and selective catalytic reduction (SCR) of nitrogen oxides from the FCC regenerator.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to $CO_2$ within the regenerator (to conserve heat and reduce air pollution) many FCC operators add a CO combustion promoter. U.S. Pat. Nos. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Catalyst regeneration usually causes formation of NOx, either in the regenerator, if operating in full CO combustion mode or in a downstream CO boiler, if operating in partial CO combustion mode. NOx emissions are becoming more of a problem, as FCC units are being forced to process worse feeds containing more NOx precursors, and as environmental regulations become stricter.

There are many approaches towards operating the FCC unit to reduce NOx emission, various catalyst additives, segregated cracking of different feeds, and regenerator modifications. These are all helpful, but can only achieve a modest reduction in NOx emissions. Some refiners need to do more, and resort to flue gas treatments to remove NOx. There are two primary NOx flue gas treatments available, thermal and catalytic.

Thermal DENOx involves operation at 870°–980° C. with urea or ammonia addition to reduce NOx. Capital costs are moderately high, because of the high temperatures, and operating costs are higher than desired, again because a large volume gas stream must be heated. Thermal DENOx is preferred by many refiners for FCC use because it works with no catalyst. A drawback to this approach is that the maximum amount of NOx reduction achievable is typically about 50%.

Catalytic reduction of NOx, the SCR process, is a proven technology used to reduce NOx emission for many refinery processes. It operates at moderate temperatures, well below those of FCC regenerators, so capital and operating costs are moderate. It adds a roughly stoichiometric amount of ammonia to a NOx containing flue gas stream and relies on a catalyst, usually honeycomb monoliths, to promote the reduction of NOx by $NH_3$. The process works best with flue gas from furnaces, which can have moderate amounts of NOx and other gaseous pollutants, but are relatively free of particulates.

SCR has never been too successful for use on cleaning up FCC flue gas stream because the catalyst fines invariably found in the FCC flue gas will overwhelm the SCR catalyst.

A typical FCC flue gas stream, even with a third stage separator, can have dust loadings above 100 mg/$NM^3$. While third stage separators or a baghouse might reduce this to some extent, refiners usually must resort to an electrostatic precipitator to reduce dust loading below 50 mg/$NM^3$. A good electrostatic precipitator might reduce dust loadings to the 10–30 mg/$NM^3$, with 20 mg/$NM^3$ being readily achievable. Such dust loadings are too high to permit long service life of the commercially available SCR catalyst elements with a honeycomb design. The very nature of the honeycomb catalyst elements, with many parallel, small diameter paths means that dust particles will not have to travel far to reach a catalyst surface, where they tend to stay and accumulate. The honeycomb elements reduce turbulence and induce a laminar flow regime through the parallel cells of the honeycomb catalyst.

The FCC catalyst fines do not react with the SCR catalyst elements, rather they blanket the catalyst with a layer of dust. The diffusion limitations introduced by the catalyst fines prevents the active and long lived catalyst elements from working effectively. Some of the attempts at dealing with catalyst fouling will now be reviewed.

First, it should be noted that most commercial NOx conversion technologies now use honeycomb or monolithic catalyst elements. These have much lower pressure drops than packed beds of catalyst, and gas can continue to flow even when large amounts of fines are present.

U.S. Pat. No. 4,867,953 taught SCR using a rotating basket or honeycomb element, Exhaust gas with NOx would flow over a segment, which would eventually rotate so that incoming air, flowing in the opposite direction, could displace some of the particulates from the catalyst.

U.S. Pat. No. 4,670,226 disclosed a moving bed reactor for treating a dust laden gas.

U.S. Pat. No. 4,246,234 taught reducing nitric oxide in a dust laden gas with ammonia using a reactor passing the gas near, but not through, the catalyst bed. The only way NOx reached catalyst was via diffusion from a plurality of centrally located tubes containing fine perforations. Dust laden gas passed through the tubes, but never impinged directly on catalyst.

U.S. Pat. No. 4,682,470 Shaff disclosed a catalytic converter for cars, with a bed of catalyst beads under a compressive force, so that the catalyst would not move around.

U.S. Pat. No. 3,733,181 disclosed a radial flow NOx and CO converter for cars.

None of these approaches was completely satisfactory. While a moving bed reactor, perhaps similar to a moving bed cracking unit or a moving bed reformer, could certainly be fabricated to operate with a NOx conversion catalyst, the cost would be high.

The conventional approaches, use of large monolithic elements would work for a time, but require frequent shutdown for mechanical cleaning or replacement of the catalyst elements. This could not be tolerated in an FCC unit, where run lengths of 2–3 years must be achieved. Use of swing reactors, or oversized reactors, could perhaps overcome the short cycle problem, but would add to the cost.

A reliable and low cost way to treat fines laden streams for NOx removal is highly desirable. The system has to be mechanically simple, and ideally should operate with relatively low pressure drop. The ideal system should be designed to remove and replace some of the catalyst without shutting down the unit.

This application discloses that beds of solid, particulate catalyst could be used in a new way for selective catalytic reduction of NOx, to achieve some unexpected benefits. By using a bed of solid catalyst, and flowing gas through the bed at a sufficient velocity to expand it, causes at least limited fluidization and makes the catalyst bed self cleaning, as far as catalyst fines are concerned.

While the pressure drop through such a bed would be reasonably low, it would be higher than the pressure drop through a honeycomb. An improved reactor design was developed to permit low pressure drop SCR. This is a reactor design with "more surface area for gas entry than exist" achieved via a plurality of vertical inlets extending from under the bed well into the bed. Such a design permits particulate bed catalytic conversion of NOx containing flue gas with an unexpectedly low pressure drop. The expanded bed reactor also permits, should the need arise, some replacement of catalyst.

BRIEF SUMMARY OF THE INVENTION

The present invention provides a fluidized catalytic cracking process wherein a nitrogen compound containing heavy feed is catalytically cracked to lighter products comprising contacting said feed with a stream of regenerated cracking catalyst having an average particle size within the range of 60–80 microns in a cracking reactor to produce lighter products and spent catalyst; separating products from spent catalyst; stripping spent catalyst with steam to produce stripped catalyst; regenerating said stripped catalyst in a catalyst regeneration means by contact with an oxygen containing gas to produce regenerated catalyst and flue gas containing NOx or NOx precursors and entrained catalyst fines; recycling to said cracking reactor said regenerated cracking catalyst; catalytically reducing said NOx in said flue gas, or NOx resulting from combustion of NOx precursors in said flue gas, by passing said flue gas and entrained catalyst fines upflow through a fluidizable bed of particulate DeNOx catalyst at a superficial vapor velocity sufficient to cause expansion, fluidization and particle to particle movement in said bed of DeNOx catalyst to produce a flue gas containing a reduced amount of NOx which is discharged.

In another embodiment, the present invention provides a process for catalytically reducing NOx in a flowing gas stream containing NOx and at least 10 $mg/NM^3$ of entrained particulates comprising: charging said gas and at least 80% of the amount required by stoichiometry to reduce said NOx of a gaseous reducing agent to a lower portion of a bed of fluidizable DeNOx catalyst at a superficial vapor velocity sufficient to expand and fluidize said bed; catalytically reducing NOx with said gaseous reducing agent by passing said flowing gas through said bed at NOx conversion conditions and simultaneously: depositing entrained solids on said catalyst; and dislodging or elutriating deposited solids from said catalyst; and withdrawing from an upper portion of said fluidized a flowing gas stream with a reduced content of NOx and containing dislodged or elutriated solids from said DeNOx catalyst.

In an apparatus embodiment, the present invention provides a low pressure drop DeNOx reactor which comprises a generally vertical, cylindrical vessel containing at an intermediate elevation thereof a dense phase fluidized bed of catalyst having a height: an inlet in a lower portion of said vessel for gas and entrained solids connective with a vapor space beneath said fluidized bed; a plurality of vertical, cylindrical or conical gas distribution means wholly immersed within and covered by said fluidized bed having an open base in fluid communication with said lower portion of said vessel and perforate sides extending up from 10 to 90 of said height of said bed for lateral distribution of gas from said distribution means into said fluidized bed; a treated gas outlet in a dilute phase region above said fluidized bed for removal of gas having a reduced NOx content.

BRIEF DESCRIPTION OF THE DRAWINGS

FIG. 2 (invention) is a sectional view of an expanded bed SCR reactor design.

FIG. 3 (invention) is a sectional view of a low pressure drop expanded bed SCR reactor design.

DETAILED DESCRIPTION

Figure 1:
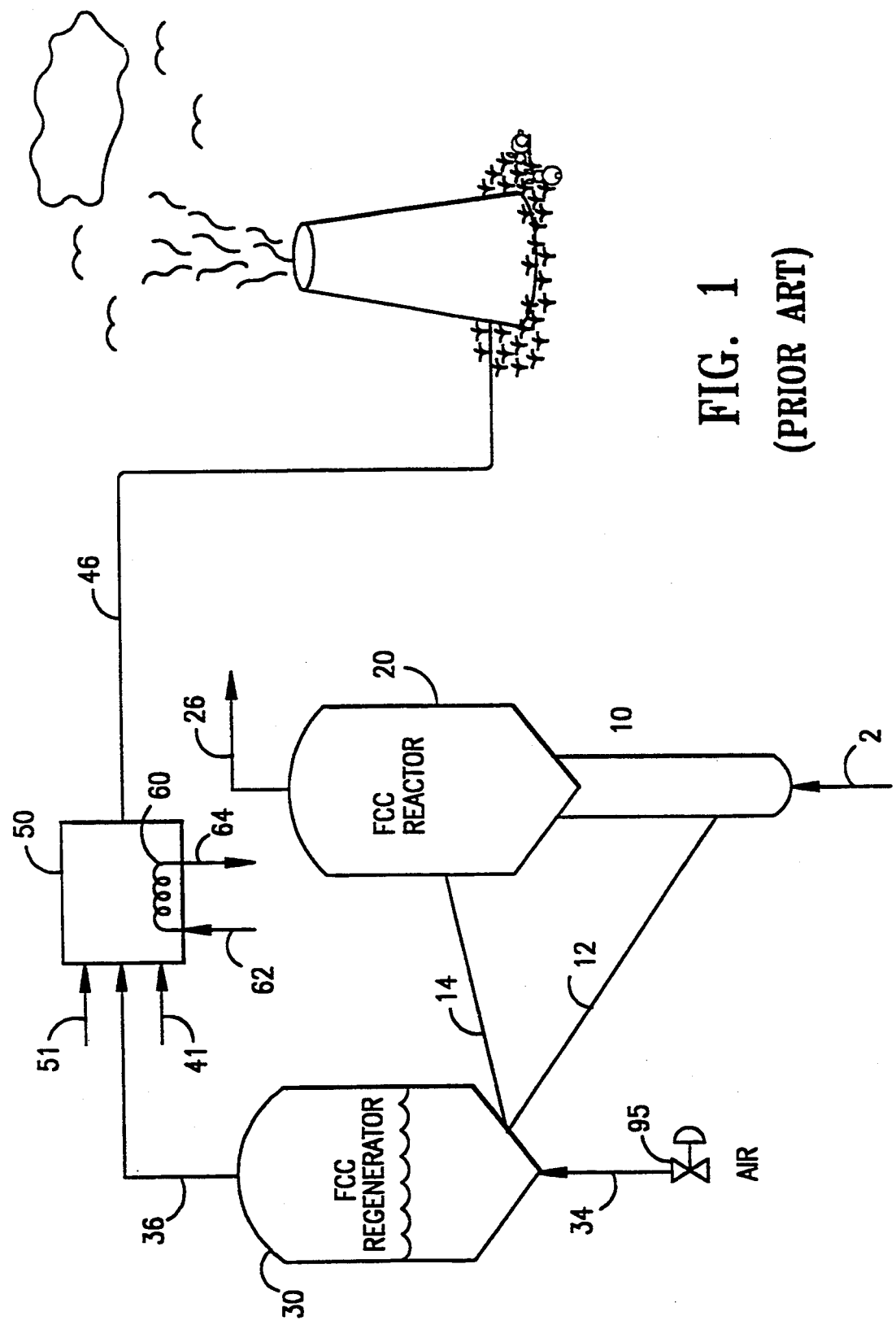
FIG. 1 (prior art) is a schematic view of an FCC unit of the prior art with a CO boiler and SCR unit for DeNOx.

The present invention can be better understood by reviewing it in conjunction with a conventional riser cracking FCC unit.

A heavy, nitrogen containing feed is charged via line 2 to riser reactor 10. Hot regenerated catalyst removed from the regenerator via line 12 vaporizes fresh feed in the base of the riser reactor, and cracks the feed. Cracked products and spent catalyst discharge into vessel 20 and are separated. Spent catalyst is stripped in a stripping means not shown in the base of vessel 20, and stripped catalyst charged via line 14 to regenerator 30. Cracked products removed from vessel 20 via line 26 are charged to an FCC main column, not shown. Spent catalyst is maintained as a bubbling, dense phase fluidized bed in vessel 30. Regeneration gas, usually air, sometimes supplemented with oxygen, is added via line 34 to the base of the regenerator. Air flow is controlled by flow control valve 95. In the embodiment shown, sufficient air is added so that the regenerator is in complete CO combustion mode, producing a flue gas containing little CO but relatively large amounts of NOx. Regenerated catalyst removed via line 12 is recycled to the base of the riser reactor.

Flue gas removed from the regenerator via line 36 is charged to SCR Reactor 50. Reducing gas, usually ammonia, is added via lines 41 and 51 to the reactor. This gas may also be added directly to the flue gas line 36 by means not shown. The temperature in the SCR will usually be reduced well below that of the FCC regenerator by cooling using heat exchange means 60. Heat recovery and/or power recovery may also occur upstream of the SCR reactor, by means not shown. In most refineries boiler feed water is added via line 62 to heat exchange tubes 60 and steam recovered via line 64.

In SCR reactor 50 the NOx reacts with the ammonia while passing through a plurality of honeycomb catalyst elements. Flue gas with a reduced NOx content is discharged via line 46 to a stack for discharge to the atmosphere.

FIG. 2 (invention) is a sectional view of an expanded bed SCR reactor design. It may be substituted for SCR Reactor 50 shown in FIG. 1.

FIG. 2 shows flue gas containing NOx charged via line 136 into a lower portion of reactor 150. Ammonia, or other reducing gas, is added via line 141 to the flowing flue gas stream. Flue gas passes up through bottom screen or support means 110 into an expanded bed of catalyst 120. Hold down screen 130 is preferably provided to prevent loss of any of the SCR catalyst. Treated flue gas is removed from an upper portion of vessel 150 via line 146 and discharged to the atmosphere via a stack, not shown.

Catalyst may periodically be removed and added using catalyst transfer means 170. Spent catalyst can flow out line 175 across slide valve 180 and replaced with fresh catalyst flowing in the reverse direction, should this be necessary.

FIG. 3 (invention) is a sectional view of a low pressure drop, expanded bed SCR reactor design which may be used in place of the conventional SCR reactor 50 shown in FIG. 1.

Flue gas is charged to a lower portion of reactor 250 via line 236. Ammonia is added via line 241. In this design support plate 210 is solid, forcing gas to enter the expanded catalyst bed 220 via a plurality of cylindrical inlet distributors. These are defined at the base by an opening 260 to the vapor space in a lower portion of vessel 250, a vertical cylindrical gas permeable region 265 and an upper imperforate cap 270. Gas flows up into the cylindrical distributors and then laterally into bed 220, to eventually pass out through the tope of the expanded catalyst bed, held in place with retaining screen 230. Treated flue gas is removed from an upper vapor space of reactor 250 via line 246 for discharge to the atmosphere.

Other configurations are possible for the low pressure drop design, i.e., the entire base 210 may be of screen or mesh construction, as may section 270. To prevent bypassing of gas from the top of section 270 it is important to have enough catalyst within the expanded bed to cover and seal section 270. Gas flow will be less uniform through bed 220, but the simplicity of the construction, and maintaining more of the bed 220 in active contact with gas will offset to some extent this non-uniform gas flow.

It is also possible, though not usually necessary, to provide several reactors in series, or several expanded catalyst beds in series in the same reactor vessel.

Having provided an overview of the FCC process and a conventional SCR unit, a detailed review of the FCC process and the SCR reactor design of the invention follows. The SCR reactor may be used downstream of other processes which must process a flue gas containing NOx, but FCC produces the most troublesome flue gas streams, so it is reviewed at length.

FCC FEED

Any conventional FCC feed can be used. The feeds may range from typical petroleum distillates or residual stocks, either virgin or partially refined, to coal oils and shale oils. The feed frequently will contain recycled hydrocarbons, such as light and heavy cycle oils which have already been cracked. Preferred feeds are gas oils, vacuum gas oils, atmospheric resids, and vacuum resids. Most feeds have an initial boiling point above about 340°–350° C.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

The catalyst inventory may contain one or more additives, either as separate additive particles, or mixed in with each particle of the cracking catalyst. Additives can enhance octane (shape selective zeolites, typified by ZSM-5, and other materials having a similar crystal structure), absorb SOX (alumina), or remove Ni and V (Mg and Ca oxides). The FCC catalyst composition, per se, forms no part of the present invention.

FCC REACTOR CONDITIONS

Conventional cracking conditions may be used. Typical riser cracking reaction conditions include catalyst/oil ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 480° to about 570° C.

It is preferred, but not essential, to use an atomizing feed mixing nozzle in the base of the riser reactor, such as the Atomax Nozzle available from the M. W. Kellogg Co. More details about the nozzle are disclosed in U.S. Ser. No. 08/066595, now U.S. Pat. No. 5,289,976 which is incorporated by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 5,055,177 to Haddad et al.

It is preferred, but not essential, to use a hot catalyst stripper. Hot strippers heat spent catalyst by adding hot, regenerated catalyst. Suitable hot stripper designs are shown in U.S. Pat. Nos. 3,821,103 and 4,820,404, incorporated by reference.

The FCC reactor and stripper conditions, per se, can be conventional.

CATALYST REGENERATION

The process and apparatus of the present invention can use conventional FCC regenerators. Most regenerators are either bubbling dense bed or high efficiency riser regenerator designs. The regenerator, per se, forms no part of the present invention.

A high efficiency regenerator, such as is shown in several of the patents incorporated by reference, also works very well. These have a coke combustor, a dilute phase transport riser and a second dense bed with recycle of some regenerated catalyst to the coke combustor. Preferably, a riser mixer is used. These are widely known and used.

Two stage regenerators, usually associated with resid crackers, involve a first stage regeneration at relatively low temperature and relatively high steam partial pressure, with a second stage at higher temperature at drier conditions.

Regenerator conditions usually include a temperature of 650° to 1000° C., preferably 700° to 800° C., and most preferably 720° to 775° C., a pressure of atmospheric to 3 or 4 atmospheres. They may operate in either full or partial CO combustion mode.

THIRD STAGE SEPARATOR/ELECTROSTATIC PRECIPITATOR

Preferably a third stage separator, electrostatic precipitator or equivalent device removes catalyst and fines from flue gas upstream of the SCR reactor.

Third stage separators are available from several commercial vendors, such as Filtrol. These usually involve many small diameter cyclones. These remove most of the catalyst fines from the regenerator flue gas, but frequently leave too much in the way of particulates to permit passage of the hot flue gas through a power recovery turbine. Such gas streams usually are too contaminated with fines to permit them to be charged to conventional SCR units.

Electrostatic precipitators are used by many refiners to increase removal of 20 micron and smaller particles. Such technology is well known and widely used, and further discussion is not necessary for those skilled in the cracking arts.

Bag house filters are yet another way to reduce the amount of fines in regenerator flue gas, though usually FCC flue gas temperatures are higher than optimum for use with most filter fabrics. Porous stainless steel, or other porous solid filters may also be used to reduce the fines content of flue gas.

The process of this invention does not require any of these filtering or pretreating steps. The process works well with very dusty gas streams, but refiners will usually require such pretreatment steps to comply with other refinery regulations, such as limits on particulates emissions or to permit use of a power recovery turbine.

To comply with local regulations particulate removal means may also be used upstream or downstream of the SCR reactor. If used they are preferably upstream of the SCR reactor.

SCR CATALYST/OPERATING CONDITIONS

Both the SCR catalyst and operating conditions may be conventional. Catalysts are available from several vendors though usually in the form of honeycombs or monoliths. Such materials could be run through a crusher and screened to recover some materials with appropriate sizes for use in the reactor, but that is not preferred.

Spherical catalysts are preferred, either oil dropped spheres, or fairly large spray dried materials. A support with ideal properties in the bead catalyst made for moving bed cracking units, though V, Ni, Pt or other desired catalytic components must be added.

Suitable catalyst are available from Babcock-Hitachi, Camet (W. R. Grace), Cormetech, Engelhard, Foster-Wheeler, Hitachi-Zosem, Johnson-Matthey, Joy-Kawasaki, Norton and Steuler. Conventional catalysts are based on vanadia/titania. Steuler and Norton also supply zeolite-based SCR catalyst.

Mobil's ZSM-5 containing catalyst is effective for NOx reduction, as disclosed in U.S. Pat. No. 4,778,665 which is incorporated by reference. ZSM-5 containing SCR catalyst in honeycomb form is commercially available through Mobil/Steuler.

Commercial bead forming technology for making moving bed or Thermofor Catalytic Cracking (TCC) catalyst may be used to produce ZSM-5 containing DeNOx catalyst in pellet or bead form.

The catalyst composition per se forms no part of the present invention.

Reaction conditions can be conventional, and will usually be tailored to work with the chosen catalyst and meet other constraints. Temperatures will usually be within the range of about 150° to 650° C., preferably 200°–550° C., and most preferably 230° to 430° C. Pressures will usually be 0–3 Barg, preferably 0–0.7 Barg The amount of catalyst will be determined by catalyst activity at a given temperature, and the degree of NOx conversion desired.

Enough ammonia or ammonia precursor such as urea should be added to react with the NOx present and produce a stack gas with the desired NOx content. It usually is better to operate with slightly less than stoichiometric ammonia or other reducing gas, to reduce the chances of discharging ammonia. Similarly lower temperatures are preferred to minimize the chance of oxidizing ammonia to form more NOx.

Any CO or hydrocarbon remaining in the FCC flue gas stream, or other process stream to be treated, may be used to reduce or perhaps even eliminate the amount of ammonia added.

The operating conditions can be conventional and by themselves form no part of the present invention. The amount of catalyst depends on catalyst activity and conversion desired, and this can be conventional. The state of the catalyst bed, i.e., bed expansion, and bed fluidization are critical and are reviewed at greater length below.

BED FLUIDIZATION

It is essential to have a SCR catalyst and gas flow sufficient to achieve at least incipient fluidization, and preferably sufficient to expand the volume of the bed at least 10%, preferably 10–30%, and most preferably about 20%. The velocity needed depends on the catalyst size, shape and density, as well as the gas properties. There are many texts on fluidization, such as "Fluidization" edited by J. F. Davidson and D. Harrison, Academic Press, London and New York, 1971, with details on such calculations. This text is incorporated by reference.

Although great variation is theoretically possible, such as operating at extremely high gas velocities with a very dense catalyst, in practice most users will use catalysts of similar size, with similar properties, at similar superficial vapor velocities. Very dense catalyst usually lacks sufficient porosity, while very light catalysts break apart too easily. Very small catalysts reduce diffusion limitations, but increase material handling concerns, while very large sized catalysts is difficult to fluidize and may be diffusion limited.

Thus in most units the catalyst will be something like bead cracking catalyst, with a diameter near 0.2–0.35 cm, though possibly ranging from 0.16 to 0.64 cm. The gas velocity will usually be above 0.5 m/s, but rarely above 5 m/s, and will usually range from 1–3 m/s and typically 1.5 to 2.5 m/s.

ILLUSTRATIVE EMBODIMENT

The following is based on estimates and some real data. The catalyst physical properties were:
Diameter=0.32 cm (range=0.16–0.64 cm)
Catalyst Density=1.2 g/cm$^3$
Flue Gas Properties:
Temperature=650° F.
Pressure=20" water
Viscosity=0.0305 centipoise
Density=0.00056 g/cm$^3$
Rate=87,078 kg/hr
Molecular Weight=28.12
Dust Loading=20 mg/Nm$^3$ after Electrostatic Precipitator
(100 mg/Nm$^3$ before Electrostatic Precipitator)

| Composition, mol % | |
|---|---|
| $N_2$ | 72.07 |
| $O_2$ | 4.45 |
| $CO_2$ | 8.01 |
| $H_2O$ | 14.61 |
| Ar | 0.86 |

| | Commercial SCR Design (Dust Free) | Proposed SCR Design (With Dust) |
|---|---|---|
| Space Velocity | 14,400 | 14,400 |
| Catalyst Frontal Area, ft$^2$ | 86 | 254*<br>86** |
| Total Catalyst Volume, ft$^3$ | 340 | 340 |
| Ammonia Injection Rate, lb/hr | 7.5 | 7.5 |
| $NO_x$ Conversion, % | 90 | 80*** |

*conventional bed design to satisfy 6 ft/s superficial velocity
**Lateral Flow Reactor design
***Reduced catalyst effectiveness is due to partial pore blockage by the dust.

Although the NOx conversion seems lower in this example by using the present invention, there are other considerations. This design can continue to operate for months and years with about the same NOx conversion, while a honeycomb converter would be overwhelmed by dust in the flue gas of a typical FCC unit, even if an electrostatic precipitator were installed.

The slight loss in conversion in this design can be eliminated by simply adding more catalyst volume, roughly 35–45% more catalyst would increase NOx conversion to about 90%, and maintain it despite the dusty environment.

DISCUSSION

The new design is easy to fabricate using conventional techniques, and provides a reliable way to convert NOx to nitrogen downstream of dusty processes such as FCC using an SCR reactor which enjoys a long cycle length.

I claim:

1. A fluidized catalytic cracking process wherein a nitrogen compound containing heavy feed is catalytically cracked to lighter products comprising:
contacting said feed with a stream of regenerated cracking catalyst having an average particle size within the range of 60–80 microns in a cracking reactor to produce lighter products and spent catalyst;
separating products from spent catalyst;
stripping spent catalyst with steam to produce stripped catalyst;
regenerating said stripped catalyst in a catalyst regeneration means by contact with an oxygen containing gas to produce regenerated catalyst and flue gas containing NOx or NOx precursors and entrained catalyst fines;
recycling to said cracking reactor said regenerated cracking catalyst; catalytically reducing said NOx in said flue gas, or NOx resulting from combustion of NOx precursors in said flue gas, by passing said flue gas *and a reducing agent consisting essentially of CO and/or hydrocarbons found in said flue gas from said FCC regenerator* and entrained catalyst fines upflow through a fluidizable bed of particulate DeNOx catalyst having a particle size of 0.16 to 0.64 cm at a superficial vapor velocity sufficient to cause expansion, fluidization and particle to particle movement in said bed of DeNOx catalyst, and maintain at least a majority of said bed as an expanded, bubbling or turbulent fluidized bed with essentially no transport of DeNOx catalyst from the bed, and cause sufficient particle to particle movement to abrade, attrit or elutriate fines deposited on said DeNOx catalyst so that there is no net increase in fines loading of said catalyst bed at steady state, to produce a flue gas containing a reduced amount of NOx which is discharged.

2. The process of claim 1 wherein said DeNOx catalyst has a particle size of 0.2 to 0.35 cm.

3. The process of claim 1 wherein said DeNOx catalyst is maintained as an expanded fluidized bed or a bubbling dense phase fluidized bed.

4. The process of claim 1 wherein said DeNOx catalyst is maintained as a turbulent fluidized bed.

5. The process of claim 1 wherein said DeNOx catalyst comprises a catalytically effective amount of Pt, Ni, Fe, Cr, Cu, Mo, Co, V, the lanthanides, the actinides and combinations thereof on a support.

6. The process of claim 1 wherein said DeNOx catalyst comprises a zeolite having a Constraint Index of 1–12 on a support.

7. The process of claim 1 wherein said DeNOx catalyst comprises a ZSM-5.

8. The process of claim 1 wherein the flue gas contains more than 10 mg/$NM^3$ solids.

9. The process of claim 1 wherein the DeNox conversion conditions include a temperature of 230° to 650° C. and a pressure of atmospheric to 3 Bar, gage.

* * * * *